United States Patent
Christ et al.

(10) Patent No.: US 7,923,112 B2
(45) Date of Patent: *Apr. 12, 2011

(54) LATENT HEAT STORAGE MATERIAL AND PROCESS FOR MANUFACTURE OF THE LATENT HEAT STORAGE MATERIAL

(75) Inventors: Martin U. Christ, Augsburg (DE);
Oswin H. Ottinger, Meitingen (DE);
Jurgen J. Bacher, Wertingen (DE)

(73) Assignee: SGL Carbon SE, Wiesbaden (DE)

( * ) Notice: Subject to any disclaimer, the term of this patent is extended or adjusted under 35 U.S.C. 154(b) by 286 days.

This patent is subject to a terminal disclaimer.

(21) Appl. No.: 11/689,993

(22) Filed: Mar. 22, 2007

(65) Prior Publication Data

US 2008/0230203 A1     Sep. 25, 2008

Related U.S. Application Data

(63) Continuation-in-part of application No. 11/127,819, filed on May 12, 2005, now Pat. No. 7,235,301.

(51) Int. Cl.
*B32B 9/00* (2006.01)
(52) U.S. Cl. ........................................ 428/408; 165/185
(58) Field of Classification Search .................. 428/408; 165/185
See application file for complete search history.

(56) References Cited

U.S. PATENT DOCUMENTS

| 3,404,061 | A |  | 10/1968 | Shane et al. |
| 4,513,053 | A | * | 4/1985 | Chen et al. .................... 428/221 |
| 5,070,223 | A |  | 12/1991 | Colasante |
| 5,709,740 | A |  | 1/1998 | Haider et al. |
| 6,391,442 | B1 |  | 5/2002 | Duvall et al. |
| 6,645,456 | B2 |  | 11/2003 | Ottinger et al. |
| 6,746,768 | B2 |  | 6/2004 | Greinke et al. |
| 6,835,453 | B2 |  | 12/2004 | Greenwood et al. |
| 7,235,301 | B2 | * | 6/2007 | Bacher et al. ................. 428/408 |
| 2002/0016505 | A1 |  | 2/2002 | Gally et al. |
| 2002/0033247 | A1 |  | 3/2002 | Neuschutz et al. |
| 2003/0151030 | A1 |  | 8/2003 | Gurin |

(Continued)

FOREIGN PATENT DOCUMENTS

AU      3941197      2/1998

(Continued)

OTHER PUBLICATIONS

Fukai, Jun , et al., "Thermal conductivity enhancement of energy storage media using carbon fibers", Energy Conversion & Management, No. 41, (2000), 1543-1556.

(Continued)

*Primary Examiner* — Angela Ortiz
*Assistant Examiner* — Daniel Miller
(74) *Attorney, Agent, or Firm* — Blakely Sokoloff Taylor & Zafman LLP

(57) ABSTRACT

The invention relates to a latent heat storage material comprising a first phase change material, at least one second phase change material different from the first phase change material, and an expanded graphite material wherein the first phase change material and the at least one second phase change material are intermixed and the latent heat storage material exhibits a phase transition over a range of temperatures. The invention also relates to a process for the preparation of a latent heat storage material comprising combining a mixture of an expanded graphite material and a first phase change material with at least one different second phase change material.

22 Claims, 4 Drawing Sheets

U.S. PATENT DOCUMENTS

| | | | |
|---|---|---|---|
| 2004/0084658 A1* | 5/2004 | Ottinger et al. | ............... 252/500 |
| 2005/0007740 A1 | 1/2005 | Neuschuetz et al. | |
| 2005/0258349 A1 | 11/2005 | Matsuyama et al. | |
| 2008/0230203 A1 | 9/2008 | Christ et al. | |

FOREIGN PATENT DOCUMENTS

| | | |
|---|---|---|
| CA | 2472278 | 7/2003 |
| DE | 19630073 | 1/1998 |
| DE | 10200318 | 7/2003 |
| EP | 1416027 | 5/2008 |

OTHER PUBLICATIONS

Xiao, Min, et al., "Preparation and performance of shape stabilized phase change thermal storage materials with high thermal conductivity", Energy Conversion and Management, vol. 43, (2002), 103-108.

* cited by examiner

LATENT HEAT STORAGE MATERIAL AND PROCESS FOR MANUFACTURE OF THE LATENT HEAT STORAGE MATERIAL

CROSS-REFERENCE TO RELATED APPLICATION

This application is a continuation-in-part of U.S. patent application Ser. No. 11/127,819, filed May 12, 2005 (now U.S. Pat. No. 7,235,301), entitled "Latent Heat Storage Material, Latent Heat Storage Unit Containing the Material, Processes for Producing the Material and the Unit and Processes for Using the Material."

BACKGROUND

1. Field

A latent heat storage material and a process for the preparation of the latent heat storage material. More specifically, treating a mixture of expanded graphite material and a first phase change material with at least one second phase change material wherein the first and second phase change materials are immiscible to form a latent heat storage material.

2. Background

A phase change material (PCM) is capable of storing heat energy in the form of latent heat. Such materials undergo a phase transition when heat is supplied or removed, for example, a transition from the solid to the liquid phase (melting) or from the liquid to the solid phase (solidification) or a transition between a low-temperature and a high-temperature modification or a hydrated and a de-hydrated modification or between different liquid modifications. If heat is supplied to or removed from a phase change material, on reaching the phase transition point, the temperature remains constant until the material is completely transformed. The heat supplied or released during the phase transition, which causes no temperature change in the material, is known as latent heat.

The thermal conductivity of most phase change materials tends to be rather low. As a consequence, the charging and discharging of a latent heat storage device is a relatively slow process. This problem can be overcome by increasing the thermal conductivity of the phase change material by, for example, formation of a composite with a material having a high thermal conductivity. For example, according to Australian Patent Application AU 3941197 A1, a porous matrix formed of graphite can be impregnated in vacuo with a "solid-liquid" phase change material in the liquid phase. Impregnation can be performed through the use of immersion, vacuum or vacuum-pressure processes.

In addition, according to European Patent Application EP 1416027 A1, corresponding to U.S. Patent Application Publication No. US 2004/0084658, the addition of a relatively small volume (5 percent (%) or more) of expanded graphite as a heat-conducting auxiliary agent to latent heat storage materials results in a significant increase in thermal conductivity. In this aspect, the addition of a dimensional stabilizing material is not necessary. The advantages of a latent heat storage material with expanded graphite in comparison to a latent heat storage material with an equal volume content of synthetic graphite can be attributed to the nature, structure and morphology of expanded graphite.

In addition, U.S. Patent Application Publication No. US 2005/0258349 A1 describes a latent heat storage material comprising a phase change material having particles of graphite incorporated therein. At least part of the graphite is made up of flakes having a high anisotropy of thermal conductivity, a high aspect ratio and formed from one of natural graphite or anisotropic synthetic graphite.

Still further, U.S. Patent Application Publication No. US 2005/0007740 A1 describes a device for cooling heat-producing components including a heat-dissipating unit which contains at least one phase change material having a phase change temperature ($T_{PC}$). The phase change material is arranged in the cooling device by its $T_{PC}$ according to a temperature gradient. The heat-absorbing unit may further include at least two phase change materials having different $T_{PC}$ which are arranged relative to one another in the cooling device by their $T_{PC}$ according to the temperature gradient. In this aspect, the phase change of both a phase change material with the higher $T_{PC}$ arranged in the vicinity of the heat-dissipating unit, e.g. a CPU, and a second phase change material with a lower $T_{PC}$ arranged in the more remote region of the heat sink, occurs substantially simultaneously just below a critical temperature of the CPU and therefore boosts the cooling effect.

The above described techniques lead to products having a relatively small phase transition range or a transition at a single point by arranging the phase change material according to a temperature gradient. One disadvantage of this is that the phase change materials show a very narrow temperature region in which the phase change occurs and therefore are restricted in their usage. For example, in the case of a solar heat storing material for domestic warm water preparation, a phase change material would be selected which has a transition temperature at approximately 60 degrees Celsius (° C.). In middle and north Europe, however, only a maximum water temperature of 40° C. will be reached in the winter time using standard solar panels. Thus, solar heat cannot be stored.

SUMMARY

The embodiments described herein provide PCMs with broad temperature intervals for use in a variety of contexts.

In one embodiment, the invention relates to a latent heat storage material comprising a first phase change material, at least one second phase change material and an expanded graphite material. The first and said second phase change materials are immiscible and may have different phase change temperatures in the latent heat storage material, for example, differing in a range up to about 50 K.

In a further embodiment, the invention relates to a process for the preparation of latent heat storage materials by combining a mixture of expanded graphite material and a first phase change material with at least one second phase change material. The first and second phase change materials are immiscible in the combination and may have different phase change temperatures, for example, differing in the range of up to about 50 K. Other features, details and advantages will be best understood from the following detailed description including examples.

DETAILED DESCRIPTION

Processes for the production of expanded graphite are known from, for example, sources such as U.S. Pat. No. 3,404,061. A starting material may be flaky natural graphite or synthetic graphite. The graphite flakes of the starting material are treated with a solution of an intercalating agent, for example, with a mixture of concentrated sulfuric acid and nitric acid, with fuming nitric acid or with a mixture of hydrogen peroxide and concentrated sulfuric acid, resulting in the formation of a graphite salt or a similar graphite intercalation compound. Further intercalation agents are contemplated and known in the art.

U.S. Pat. No. 6,645,456 discloses an intercalation mixture formed of at least one strong concentrated acid selected from the group including sulfuric acid and nitric acid, an oxidizing agent selected from the group including concentrated nitric acid, hydrogen peroxide and peroxo sulfuric acid for oxidizing the graphite, and a thermal polyphosphoric acid. The graphite-intercalation compounds or graphite salts, for example, graphite hydrogen sulfate or graphite nitrate, are heated in a shock-like manner. Upon heating, the volume of the graphite significantly increases. The obtained expanded graphite comprises concertina-shaped bulky aggregates.

It is appreciated that the components described above may be combined by adding both particles of expanded graphite material and particles obtained by shredding a planar web formed by compression of expanded graphite material into fragments, to the phase change material. The bulky concertina-shaped particles of the expanded graphite are generally difficult to handle and tend to be difficult to mix with a phase change material. To overcome this problem, the expanded graphite particles prepared by the expansion process described above may be compressed into a planar foil-like web that is cut (shredded) into fragments resulting in pieces having an average diameter between about 5 microns (μm) and about 20 millimeters (mm), and in some embodiments between about 50 μm and about 5 mm. Particles prepared in this manner can be readily mixed with a phase change material. Shredding of the graphite foil can be done in a cutting mill, a jet mill or other suitable mill. The term "expanded graphite material" as used herein includes various forms of graphite, including expanded graphite and graphite particles obtained by shredding compressed structures of expanded graphite.

Figure 1:
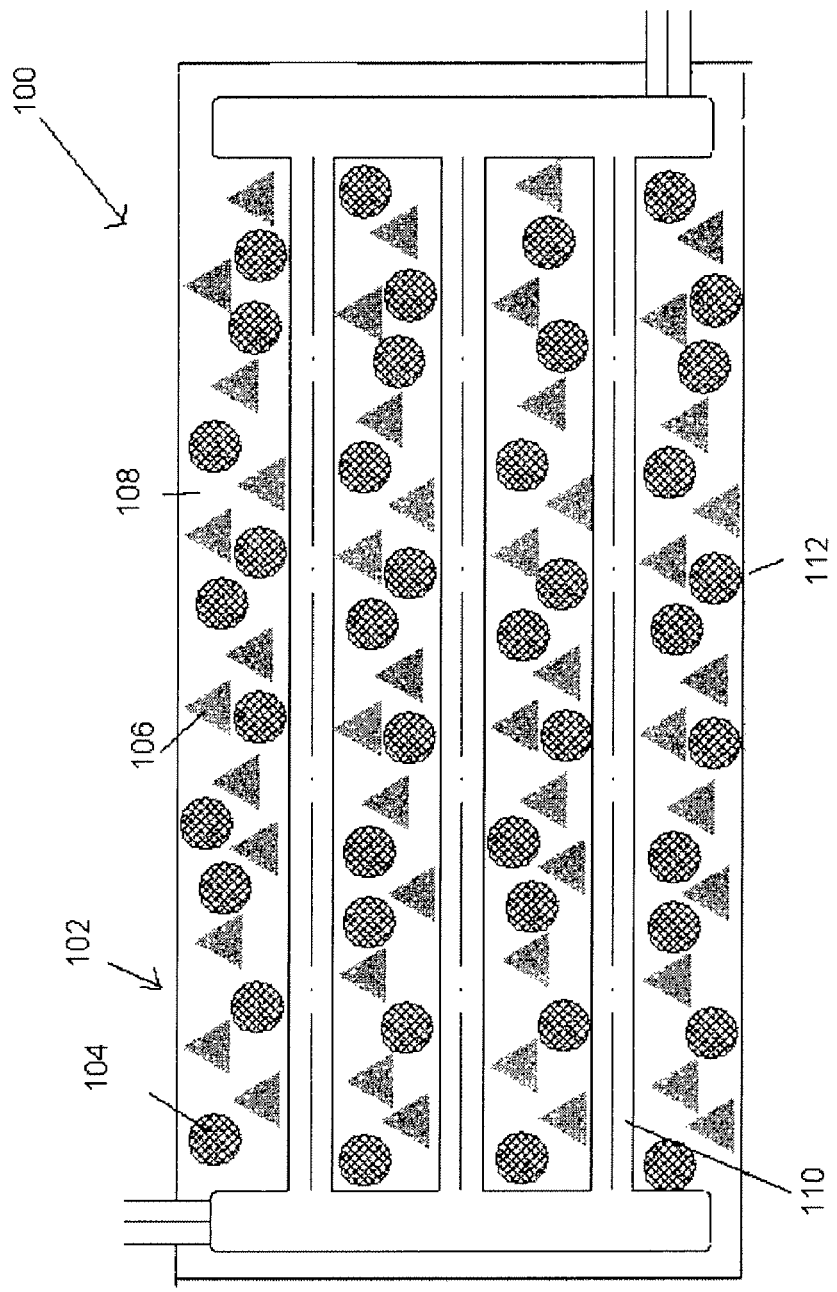
FIG. 1 shows a storage system including a latent heat storage material in accordance with one embodiment.

FIG. 1 shows a storage system including a latent heat storage material in accordance with one embodiment. In this embodiment, storage system 100 includes latent heat storage material 102 externally arranged around tube register 110 positioned within container 112. As illustrated, latent heat storage material 102 includes first phase change material 104 and second phase change material 106. It is appreciated that there may be additional phase change materials (e.g., second phase change material 106 may include several different phase change materials). In one embodiment, first phage change material 104 and second phase change material 106 have different phase change temperatures (e.g., differing up to 50K) and are shown intermixed (indiscriminately combined) in latent heat storage material 102. First phase change material 104 and second phase change material 106 are also immiscible in the sense that they do not form a single phase after mixing. Latent heat storage material 102 further includes an expanded graphite material 108. In this embodiment, expanded graphite material 108 includes expanded graphite particles with a bulk density between about 2 grams per liter and about 200 grams per liter. FIG. 1 shows a latent heat storage material including first phase change material 104 and second phase change material 106 that approximates a homogenous mixture of the phase change materials to provide a more or less even distribution of the phase change materials and expanded graphite material 108.

Referring again to first phase change material 104 and second phase change material 106, suitable phase change materials may include, but are not limited to, paraffins, sugar alcohols, polymers, in particular thermoplastic polymers, water, organic acids like fatty acids or other organic acids like capric acid, lauric acid, myristic acid, palmitic acid and stearic acid and mixtures thereof, aqueous solutions of salts, salt hydrates, mixtures of salt hydrates, inorganic and organic salts, mixtures of salts and eutectic blends of salts, clathrate hydrates and alkali metal hydroxides. Representative polymers suitable as phase change materials include, but are not limited to, polyethylene, polypropylene, polyamides, polycarbonates, polyimides, poly(butadiene), poly(isoprene), poly(hydrogenated butadiene), polyetherester elastomers, ethylene/propylene/diene (EPDM) polystyrene and polyvinyl chloride. Representative salts and salt hydrates suitable as phase change materials include, but are not limited to, ammonium and alkali and alkaline earth metal salts like chlorides, chlorates, nitrates, nitrides, sulfides, phosphates, hydroxides, carbonates, fluorides, bromides, acetates, acetamides and perborates of magnesium, sodium, potassium, calcium, lithium, barium and their hydrates. Representative salts and salt hydrates that may be used as phase change materials may further include, but are not limited to, potassium nitrate, sodium nitrate, lithium nitrate, sodium chloride, calcium chloride, lithium chlorate, and their mixtures or calcium chloride hexahydrate, magnesium chloride hexahydrate, lithium nitrate trihydrate and sodium acetate trihydrate. Representative sugar alcohols may include, but are not limited to, pentaerythritol, trimethylol-ethane, erythritol, mannitol, neopentyl glycol and mixtures thereof. It is appreciated that this identification of phase change materials is intended to be representative of such materials and not restrictive.

In some embodiments, first phase change material 104 is a salt hydrate and second phase change material 106 is a paraffin. Representatively, first phase change material 104 is sodium acetate trihydrate with a melting point of 58° C. (331K) and second phase change material 106 is a paraffin with a melting point in the range between 25° C. and 85° C. (298K and 358K).

For ease of handling, in some embodiments, the phase change material is in the form of particles with an average diameter between about 0.01 millimeters (mm) and about 10 mm. This particle size range, however, is not intended as a restriction with respect to any embodiment of the invention.

Mixing of the particles of the phase change material and particles of an expanded graphite material and/or particles obtained by shredding a planar web formed by compression of expanded graphite material and optionally added particles of non-expanded natural or synthetic graphite is carried out using any conventional mixing equipment as deemed desirable. In this aspect, any type of mixer or kneader can be used. It is noted that there are no restrictions with respect to the applied shear forces.

A volume fraction of expanded graphite material 108 in the mixture and, accordingly, in latent heat storage material 102 may be at least about two percent by volume. Below this range, the number of graphite particles tends to be too small to form a continuous network of heat-conducting paths throughout the latent heat storage material. In one embodiment, a volume fraction of the expanded graphite material should not exceed 30 percent. Above the volume fraction, the volumetric energy density of the latent heat storage material becomes rather limited since the volume fraction occupied by graphite does not contribute to the latent heat storage.

In those embodiments where the graphite fraction of the latent heat storage material contains particles of non-expanded graphite material, the volume fraction of the expanded graphite material and/or particles obtained by shredding a planar web formed by compression of expanded graphite material in the mixture and, in turn, in the latent heat storage material, should be at least about 2 percent by volume. It is recognized that this amount facilitates formation of a thermally conductive network.

Figure 2:
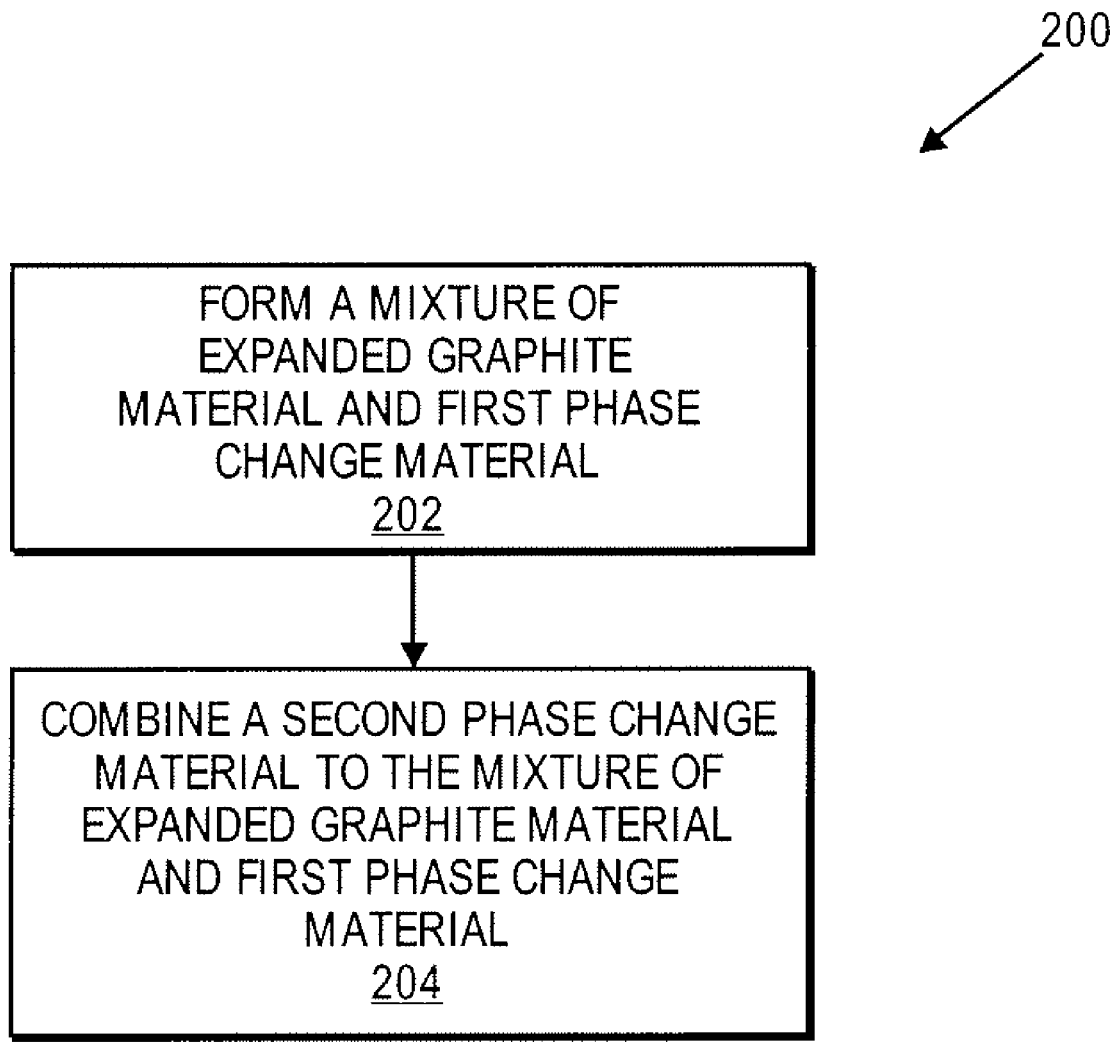
FIG. 2 is a flow chart illustrating a method of forming a latent heat storage material in accordance with one embodiment.

FIG. 2 is a flow chart illustrating a method of forming a latent heat storage material in accordance with one embodiment. In this embodiment, method 200 includes forming a latent heat storage material by first forming a mixture of particles of a first phase change material and expanded graphite material in granular form (block 202). A second phase change material is then combined with the mixture of first phase change materials and the expanded graphite material (block 204). The first phase change material and the second phase change material are different and immiscible. In one embodiment, the first phase change material and the second phase change material have different phase change temperatures such that an admixture will exhibit a phase transition over a range of temperatures, such as a range of temperatures between the different phase change temperatures. This is in contrast to miscible phase change materials that have different phase change temperatures but an admixture forms a single phase that yields a phase transition at a particular temperature rather than over a range of temperatures. In the embodiment described with reference to FIG. 2, it is contemplated that more than one second phase change material may be added. For example, the second phase change material may include several different materials each, for example, with a different phase change temperature and each immiscible with the first phase change material. In another embodiment, the first phase change material may be made up of more than one material, such as two miscible phase change materials.

In one embodiment, the combination of first and second phase change materials is accomplished by placing the first phase change material and expanded graphite material in granular form in a mold. Remaining gaps within the mold are then filled with the second phase change material(s) in molten state. In addition, during formation of the mixture of expanded graphite material and the first phase change material, the first phase change material may be in a liquid or solid state.

According to another embodiment, the latent heat storage material is formed by forming a porous body of expanded graphite with a density from about 5 grams per liter to about 500 grams per liter. The porous body is infiltrated with a first phase change material having a higher melting point than the second phase change material. The infiltrated body is then tempered below a melting point of the first phase change material but above a melting point of a second phase change material. The porous body is then again infiltrated at least one more time with at least one second phase change material having a lower melting temperature than the first phase change material.

The received latent heat storage material formed by the above techniques may be tailored to the corrosion behavior of heat exchanging pipes and/or container walls which are in contact with the latent heat storage material by choosing a less corrosive second phase change material. Further the stability of the received latent heat storage material may be improved by choosing a first phase change material which is less corrosive to the graphite material.

In still another embodiment, the latent heat storage material is prepared by forming a porous body of expanded graphite with a density of from about 5 grams per liter to about 500 grams per liter. The porous body is infiltrated with a first phase change material having a better wetting property than a wetting property of the porous body. A volume amount of the first phase change material may be lower than the porous volume of the porous body. The porous body is again infiltrated at least one more time with at least one second phase change material. In this aspect, no additional compacting is necessary, especially when the first phase change material has better wetting properties to the graphite than the second phase change material.

The latent heat storage materials described herein can be used for storage of solar heat for domestic warm water preparation or for air conditioning of rooms, buildings, vehicles, ships, yachts etc. Furthermore, they can be used to maintain a desired temperature during transport of heat sensitive goods, like food and medical goods. Other fields of application relate to storage of process heat especially in industrial or solar applications (food industry, textile or chemical industry), heat storage for steam generation, in particular process steam generation or steam generation for sterilization of medical equipment. Another application is cooling of electronic components. It is appreciated that this identification of possible applications is intended to be representative of such applications and not restrictive. In this regard, types of containers or parts that may include or constitute the latent heat storage materials in any of these or other applications are similarly not restricted.

The invention is described herein as latent heat storage materials and processes for the preparation of latent heat storage materials. The latent heat storage materials prepared by these processes and processes for using the latent heat storage materials are nevertheless not intended to be limited to the details given, since various modifications and structural changes may be made therein without departing from the spirit of the invention and within the scope and range of equivalents of the claims.

The following specific examples are set forth to illustrate the various processes for forming the latent heat storage materials described herein.

Example 1

Figure 3:
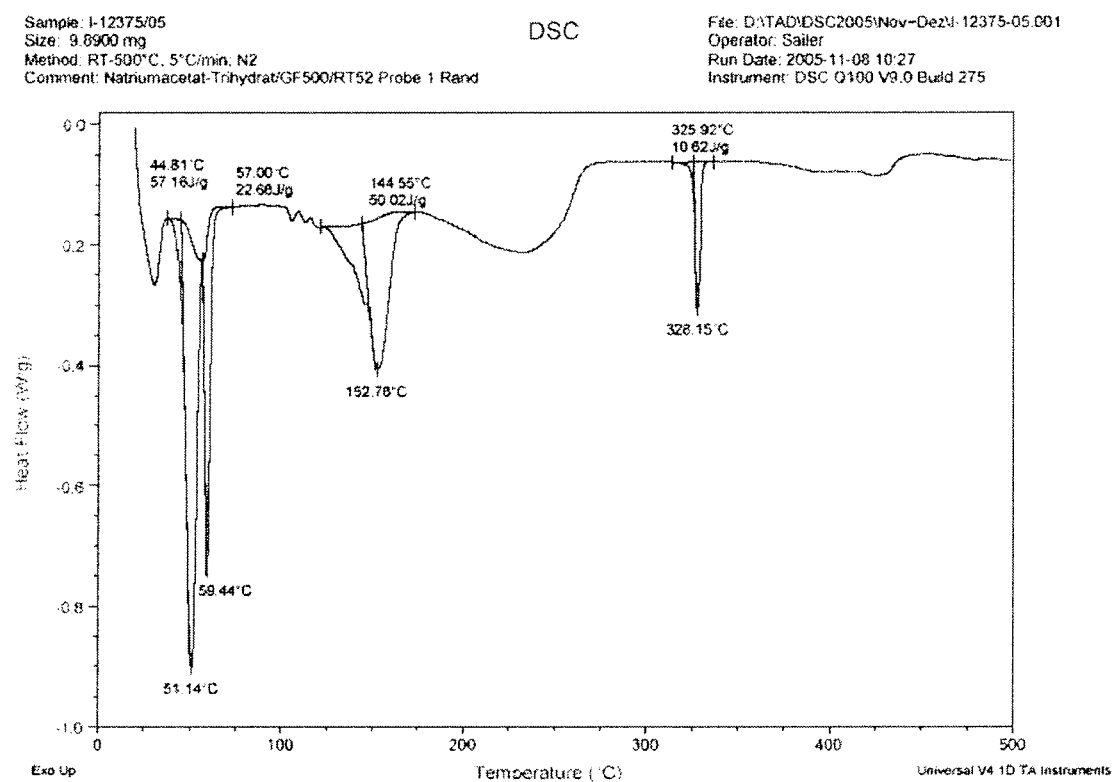
FIG. 3 is a differential scanning calorimetry graph (DSC-graph) of a latent heat storage material prepared according to an embodiment.

In one embodiment, sodium acetate trihydrate (melting temperature 58° C.) in powder form was mixed with graphite powder prepared by shredding expanded graphite foil into particles with a mean particle size of 500 μm (GFG 500) at a mixture ratio of about 85 weight percent to about 15 weight percent with a laboratory mixer. Afterwards, the resulting powder mixture was infiltrated with molten paraffin (RT 52) with a melting temperature of 52° C. provided by Rubitherm, Hamburg, and tempered at approximately 60° C. As illustrated in FIG. 3, the differential scanning calorimetry (DSC) of the PCM graphite mixture showed a melting region between the melting point of the paraffin (51.14° C.) and the melting point of the sodium acetate trihydrate (59.44° C.). The received latent heat storing material had a graphite content of about 8.5 percent by weight.

Example 2

Figure 4:
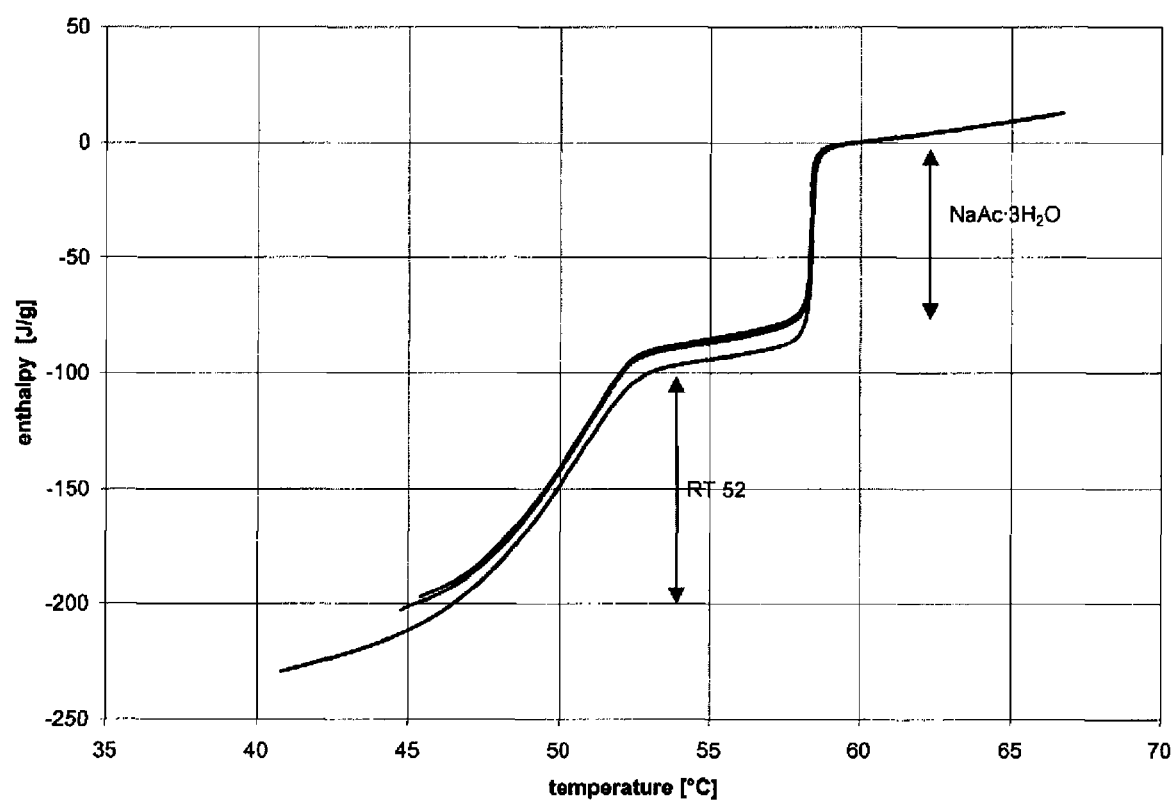
FIG. 4 shows a specific heat capacity of a latent heat storage material prepared according to an embodiment over three heating/cooling cycles.

In another embodiment, the same substances as in Example 1 were mixed in a mixture ratio of about 75 weight percent to about 25 weight percent and infiltrated with molten paraffin (RT 52). In this embodiment, the received latent heat storing material has a graphite content of 7.7 percent by weight. FIG. 4 illustrates the results of two separate melting steps over several heat/cooling-cycles Example 3

For comparison with the previously described examples, in this embodiment, a latent heat storage composite material was fabricated from a mixture of expanded graphite (20% by weight) and two miscible salts, namely, potassium nitrate ($KNO_3$)(43% by weight) and sodium nitrate ($NaNO_3$)(37% by weight). $KNO_3$ has a melting point of 337° C. and $NaNO_3$ has a melting point of 307° C. The expanded graphite was mixed with solid $NaNO_3$ powder in a laboratory mixer. Molten $KNO_3$ with a temperature of about 345° C. was cast over the powder mixture of expanded graphite and $NaNO_3$. The salt-graphite mixture was cooled down to room temperature and the melting temperature of the composite material obtained was determined by DSC. The unique melting point of this latent heat storage composite material was 220° C. rather than a phase transition over a range of temperatures as was demonstrated in Example 1 using immiscible phase change materials.

In the preceding detailed description, specific embodiments are described. It will, however, be evident that various modifications and changes may be made thereto without departing from the broader spirit and scope of the claims. The specification and drawings are, accordingly, is to be regarded in an illustrative rather than restrictive sense.

The invention claimed is:

1. A latent heat storage material comprising:
a first phase change material;
at least one second phase change material different from the first phase change material; and
an expanded graphite material comprising particles prepared by cutting a planar foil-like web obtained by compression of expanded graphite particles into fragments having an average diameter of between about 5 microns (μm) and about 20 millimeters (mm),
wherein the first phase change material and the at least one second phase change material are immiscible materials that do not form a single phase after mixing.

2. The latent heat storage material of claim 1, wherein the first phase change material comprises a first phase change temperature and the at least one second phase change material comprises at least one second phase change temperature and a difference of the first phase change temperature and the at least one second phase change temperature is in a range up to 50 K.

3. The latent heat storage material of claim 1, wherein the expanded graphite material comprises expanded graphite particles with a bulk density of between about 2 grams per liter and about 200 grams per liter.

4. The latent heat storage material of claim 1, wherein the first phase change material and the at least one second phase change material are selected from the group consisting of paraffins, sugar alcohols, polymers, water, organic acids and mixtures thereof, aqueous solutions of salts, salt hydrates, mixtures of salt hydrates, inorganic and organic salts, mixtures of salts and eutectic blends of salts, clathrate hydrates and alkali metal hydroxides.

5. The latent heat storage material of claim 1, wherein the first phase change material is a salt hydrate and the at least one second phase change material is a paraffin.

6. The latent heat storage material of claim 1, wherein the first phase change material is sodium acetate trihydrate and the at least one second phase change material is a paraffin with a melting point in the range of between about 25° C. and about 85° C.

7. The latent heat storage material of claim 1, wherein a volume fraction of expanded graphite material in the latent heat storage material is at least two percent by volume.

8. A process for the preparation of a latent heat storage material comprising:
combining a mixture of an expanded graphite material and a first phase change material with at least one different second phase change material wherein the first phase change material and at least one second phase change material are immiscible materials that do not form a single phase after mixing,
wherein the expanded graphite material comprises particles prepared by cutting a planar foil-like web obtained by compression of expanded graphite particles into fragments having an average diameter of between about 5 microns (μm) and about 20 millimeters (mm).

9. The process of claim 8, further comprising:
forming a mixture of particles of the phase change materials and expanded graphite material in granular form;
filling a mold with the granules; and
filling gaps remaining within the mold with the at least one second phase change material in a molten state.

10. The process of claim 8, wherein the first phase change material comprises a greater temperature than the at least one second phase change material, the method further comprising:
forming a porous body of expanded graphite with a density of from about 5 grams per liter to about 500 grams per liter;
infiltrating the porous body with the first phase change material,
tempering the infiltrated body at a temperature below a melting point of the first phase change material and above the melting point of the second phase change material; and
infiltrating the porous body at least a second time with the at least one second phase change material.

11. The process of claim 8, further comprising:
forming a porous body of expanded graphite with a density of from about 5 grams per liter to about 500 grams per liter;
infiltrating the porous body with a first phase change material comprising a better wetting property than a wetting property of the porous body, wherein the volume amount or the first phase change material is lower than the porous volume of the porous body; and
infiltrating the porous body at least a second time with the at least one second phase change material.

12. The process of claim 8, wherein the first phase change material is a paraffin and the at least one second phase change material is a salt hydrate.

13. The process of claim 8, wherein the first phase change material is a paraffin with a melting point in a range of between about 65° C. and about 85° C. and the at least one second phase change material comprises sodium acetate trihydrate.

14. The process of claim 8, wherein the first phase change material and the at least one second phase change material have different phase change temperatures.

15. The process of claim 8, wherein the expanded graphite material comprises expanded graphite particles with a bulk density between about 2 grams per liter and 200 grams per liter.

16. The process of claim 8, wherein the expanded graphite material comprises particles prepared by cutting a planar foil-like web obtained by compression of expanded graphite particles into fragments having an average diameter between about 5 microns (μm) and about 20 millimeters (mm).

17. The process of claim 8, wherein the expanded graphite material comprises expanded graphite particles with a hulk density between about 2 grams per liter and about 200 grams per liter and particles prepared by cutting a planar foil-like web obtained by compression of expanded graphite particles into fragments having an average diameter between about 5 microns (μm) and about 20 millimeters (mm).

18. The process of claim 8, wherein the first phase change material and the at least one second phase change material are selected from the group consisting of paraffins, sugar alcohols, polymers, water, organic acids and mixtures thereof, aqueous solutions of salts, salt hydrates, mixtures of salt hydrates, inorganic and organic salts, mixtures of salts and eutectic blends of salts, clathrate hydrates and alkali metal hydroxides.

19. The process of claim 8, wherein a volume fraction of expanded graphite material in the mixture of particles of the phase change material and expanded graphite material is at least two percent by volume.

20. A latent heat storage material comprising:
a porous body of expanded graphite having a density of from about 5 grams per liter to about 500 grams per liter infiltrated with a first phase change material and at least one second phase change material, wherein the first phase change material and the at least one second phase change material are immiscible materials that do not form a single phase after mixing.

21. The latent heat storage material of claim 20, wherein the first phase change material comprises a first phase change temperature and the at least one second phase change material comprises at least one second phase change temperature and a difference of the first phase change temperature and the at least one second phase change temperature is in a range up to 50 K.

22. The latent heat storage material of claim 20, wherein the first phase change material and the at least one second phase change material are selected from the group consisting of paraffins, sugar alcohols, polymers, water, organic acids and mixtures thereof, aqueous solutions of salts, salt hydrates, mixtures of salt hydrates, inorganic and organic salts, mixtures of salts and eutectic blends of salts, clathrate hydrates and alkali metal hydroxides.

* * * * *

UNITED STATES PATENT AND TRADEMARK OFFICE
CERTIFICATE OF CORRECTION

| | |
|---|---|
| PATENT NO. | : 7,923,112 B2 |
| APPLICATION NO. | : 11/689993 |
| DATED | : April 12, 2011 |
| INVENTOR(S) | : Martin U. Christ, Oswin H. Ottinger and Jurgen J. Bacher |

It is certified that error appears in the above-identified patent and that said Letters Patent is hereby corrected as shown below:

In the Claims, Column 8, Claim 11, line 53, please delete "or" and insert -- of --.

Signed and Sealed this
Nineteenth Day of July, 2011

David J. Kappos
*Director of the United States Patent and Trademark Office*